(12) United States Patent
Bich et al.

(10) Patent No.: US 8,141,331 B2
(45) Date of Patent: Mar. 27, 2012

(54) DIVIDER SUPPORT APPARATUS WITH INTEGRAL ADJUSTABLE TORSIONAL PRELOAD MECHANISM AND VIBRATION DAMPER

(75) Inventors: Gary L. Bich, New Holland, PA (US); Brian P. Crow, Rock Island, IL (US)

(73) Assignee: CNH America LLC, New Holland, PA (US)

( * ) Notice: Subject to any disclaimer, the term of this patent is extended or adjusted under 35 U.S.C. 154(b) by 10 days.

(21) Appl. No.: 12/763,583

(22) Filed: Apr. 20, 2010

(65) Prior Publication Data
US 2011/0252761 A1    Oct. 20, 2011

(51) Int. Cl.
A01D 34/00    (2006.01)

(52) U.S. Cl. .............................. 56/15.2; 56/15.8; 56/314

(58) Field of Classification Search .......... 56/14.3–14.5, 56/14.9–15.3, 15.7–15.9, 16.2, 17.1, 119, 56/314, DIG. 10, DIG. 14
See application file for complete search history.

(56) References Cited

U.S. PATENT DOCUMENTS

| | | | |
|---|---|---|---|
| 1,697,474 A | 1/1929 | Peters | |
| 2,855,212 A | 10/1958 | Houser | |
| 3,302,376 A * | 2/1967 | Scarnato et al. ............... | 56/12.6 |
| 3,349,549 A * | 10/1967 | Van Der Lely ............ | 56/10.2 R |
| 3,432,158 A | 3/1969 | Goodwin | |
| 3,578,750 A * | 5/1971 | Halls et al. ..................... | 56/14.4 |
| 3,660,970 A | 5/1972 | Waldrop | |
| 3,967,439 A * | 7/1976 | Mott ............................... | 56/314 |
| 4,156,338 A | 5/1979 | Hengen | |
| 4,193,250 A | 3/1980 | Kessens et al. | |
| 4,446,682 A * | 5/1984 | Jennen et al. ................... | 56/119 |
| 4,493,181 A * | 1/1985 | Glendenning et al. .......... | 56/314 |
| 4,528,804 A | 7/1985 | Williams | |
| 4,697,840 A * | 10/1987 | Duncan ...................... | 294/119.4 |
| 4,700,537 A * | 10/1987 | Emmert .......................... | 56/314 |
| 5,186,216 A | 2/1993 | Bollier | |
| 5,355,664 A * | 10/1994 | Zenner .......................... | 56/15.8 |
| 5,417,407 A | 5/1995 | Gordon | |
| 5,865,019 A | 2/1999 | Hurlburt et al. | |
| 6,513,313 B1 | 2/2003 | Bennett | |
| 6,598,381 B2 | 7/2003 | Albinger et al. | |
| 6,912,832 B1 * | 7/2005 | Thompson et al. ............ | 56/14.7 |
| 7,073,316 B2 | 7/2006 | Resing et al. | |
| 2004/0065069 A1 * | 4/2004 | Dunn et al. ..................... | 56/10.4 |
| 2006/0053761 A1 * | 3/2006 | Lougheed et al. ............. | 56/15.8 |
| 2008/0048371 A1 | 2/2008 | Dagg et al. | |
| 2010/0083629 A1 * | 4/2010 | Klotzbach et al. ........... | 56/320.1 |

FOREIGN PATENT DOCUMENTS

JP    2-117410    5/1990

* cited by examiner

Primary Examiner — Thomas Will
Assistant Examiner — Mai Nguyen
(74) Attorney, Agent, or Firm — Michael G. Harms

(57) ABSTRACT

A divider support apparatus with integral adjustable torsional preload mechanism for connecting a divider to a header frame. The mechanism includes a first element for carrying the divider and a second element configured for connection to the frame, and at least one resilient biasing element disposed between the first element and the second element and biasable by generation of a torsional loading condition between the first and second elements for applying a preload force therebetween. A preload adjusting mechanism in connection with at least one of the first element and the second element is operable for selectably adjusting the biasing of the at least one resilient biasing element in a manner for adjusting the preload force. The preload mechanism is also operable for damping vibrations emanating from the divider.

18 Claims, 7 Drawing Sheets

DIVIDER SUPPORT APPARATUS WITH INTEGRAL ADJUSTABLE TORSIONAL PRELOAD MECHANISM AND VIBRATION DAMPER

TECHNICAL FIELD

This invention relates generally to apparatus for supporting a divider on a header of an agricultural plant cutting machine, such as, but not limited to, a combine, windrower or the like, and more particularly, to support apparatus including an integral adjustable torsional preload mechanism and vibration damper which enables setting a torsionally generated preload force level for achieving desired divider position and float characteristics, and additionally which is configured for damping operational vibrations.

BACKGROUND ART

An agricultural plant cutting machine, such as, but not limited to, a combine or a windrower, generally includes a header operable for severing and collecting or gathering plant or crop material as the machine is driven over a field. The header will have a plant cutting mechanism for severing the plants or crops, which can comprise, as a non-limiting example, an elongate sickle mechanism sidewardly reciprocatingly movable relative to a non-reciprocating guard structure. At each end of the plant cutting mechanism and possibly at other locations along the width thereof, the header will typically include a divider which projects forwardly of the cutting mechanism and which moves through the crop in advance thereof for separating those plants that will be cut from adjacent plants. For standing crops such as wheat and other grasses, the dividers are located some distance above the ground surface. For other grains, particularly legumes such as soybeans, the divider will be located very close to, on, or intermittently on, the ground, and will additionally function to lift and separate laid over crops, to divide those in front of the cutting mechanism that are to be cut, from those that have laid over into the path of the divider from the side.

On some headers, to facilitate operation in close proximity to or on the ground, it is advantageous for the dividers to be supported in a manner so as to be capable of moving upwardly when urged in that direction by contact with raised ground features and irregularities, e.g., furrow ridges, rodent tunnels and hills, rocks, stones, unevenness in the ground surface, etc. It is also advantageous to apply an upwardly directed preload force against the divider, to make such movements easier, that he divider to "float" over raised objects and features more easily, and reduce impact forces generated by contact therewith, and also to accommodate various different divider configurations and settings, including height above the ground.

Typical known divider support apparatus comprise a hinge or pivot joint. Also typically, a spring mechanism, such as a coil spring rod mechanism, is used to apply the preload force. However, shortcomings of these arrangements include the complexity and space requirements thereof. The known spring mechanisms also provide no effective shock or vibration damping. They also allow the divider to bounce up and down unrestrained when the combine is traveling between fields, on roads and the like, and when the header is transported on header carts and the like.

What is sought is support apparatus for a divider of a header, which provides one or more of the advantages sought therefor, and which overcomes one or more of the disadvantages and shortcomings, set forth above.

SUMMARY OF THE INVENTION

What is disclosed is support apparatus for a header divider, including an adjustable torsional preload mechanism that provides one or more of the advantages sought therefor, and which overcomes one or more of the disadvantages and shortcomings, set forth above.

According to a preferred aspect of the invention, the support apparatus includes an adjustable torsional preload mechanism configured for connecting a divider to a frame of a header so as to be movable upwardly relative to the frame, while applying an adjustable preload force biasing the divider in a desired direction. The preload mechanism includes a first element connected to and carrying the divider for upward and downward movement about a pivotal axis, and a second element connected to the frame and carrying the first element and the divider. The mechanism includes at least one resilient biasing element disposed between the first element and the second element and biasable by exertion of a torsional or twisting loading condition between the first and second elements, for applying the preload force in the desired direction against the divider through the first element.

According to another preferred aspect of the invention, the apparatus includes a preload adjusting mechanism in connection with at least one of the first element and the second element and operable for increasing or decreasing the torsional loading condition, to thereby increase or decrease the biasing of the at least one resilient biasing element in a manner for adjusting the preload force, preferably for urging the first element and the divider upwardly about the pivotal axis.

According to another preferred aspect of the invention, the second element is a shaft concentric about the axis and is located within the first element. In particular, the first element has an inner surface bounding an interior cavity containing the shaft, and the at least one resilient biasing element comprises at least one elastomeric element disposed in the interior cavity and which is loaded in compression against the inner surface by the torsional loading condition for generating the preload force. As a nonlimiting example, the shaft can be of solid construction, having a cylindrical sectional shape, and the first element can be a tubular member having a rectangular sectional shape or otherwise configured for receiving the shaft with sufficient space therebetween for receiving the resilient biasing element or elements therebetween and accommodating relative pivotal movement of the tubular member and the shaft about the pivotal axis for exerting a torsional loading condition against the biasing element for generating the preload force.

According to another preferred embodiment of the invention, the second element comprises a shaft, and a single elastomeric member is used and attached, e.g., bonded, to at least one sleeve or bushing, or otherwise mounted about the shaft for rotation therewith about the pivotal axis. For instance, the sleeve can be mounted to the shaft by one or more keys, pins, splines, or other device or feature which locks them together. And the first element will cooperatively engage, e.g., have a shape conforming to an outer shape of the elastomeric element, such that relative rotation of the first and second elements about the pivotal axis will create the torsional loading condition by elastically deforming the elastomeric element, here, by essentially twisting the outer portion thereof in contact with the first element, about the inner portion thereof connected to the second member, such that the elastomeric element will store energy that will be exerted in a direction opposite the direction of the relative rotation, as the preload force.

According to still another preferred aspect of the invention, the preload adjusting mechanism will include a torque arm either connected directly between the first and second elements, or between the second element and the header frame, and operable for applying a torque for selectably increasing or decreasing the torsional loading condition, to thus correspondingly adjust the preload force. In this latter regard, as an example, a threaded adjusting assembly can be utilized for selectively applying the adjusting torque.

In another preferred aspect of the invention, the adjusting mechanism is configured such that, with the divider suitably positioned, the mechanism will hold the second element such that the divider is desirably positioned and biased upwardly by the preload force, to provide desired operational characteristics.

As an advantage of the invention, the support and adjustable preload for the divider are provided by a single integrated assembly, which is simpler than known prior art support and preload apparatus. And, the preload is easily adjustable as required or desired for a particular divider set up, ground height, and float capability sought. As another advantage, the support apparatus has sufficient vibration damping properties for damping vibrations generated by reciprocating movements of the divider, for instance, while the header is being carried in a cantilever manner on the combine or a header cart, and resulting from contact with raised ground features and irregularities.

DETAILED DESCRIPTION OF THE INVENTION

Figure 1:
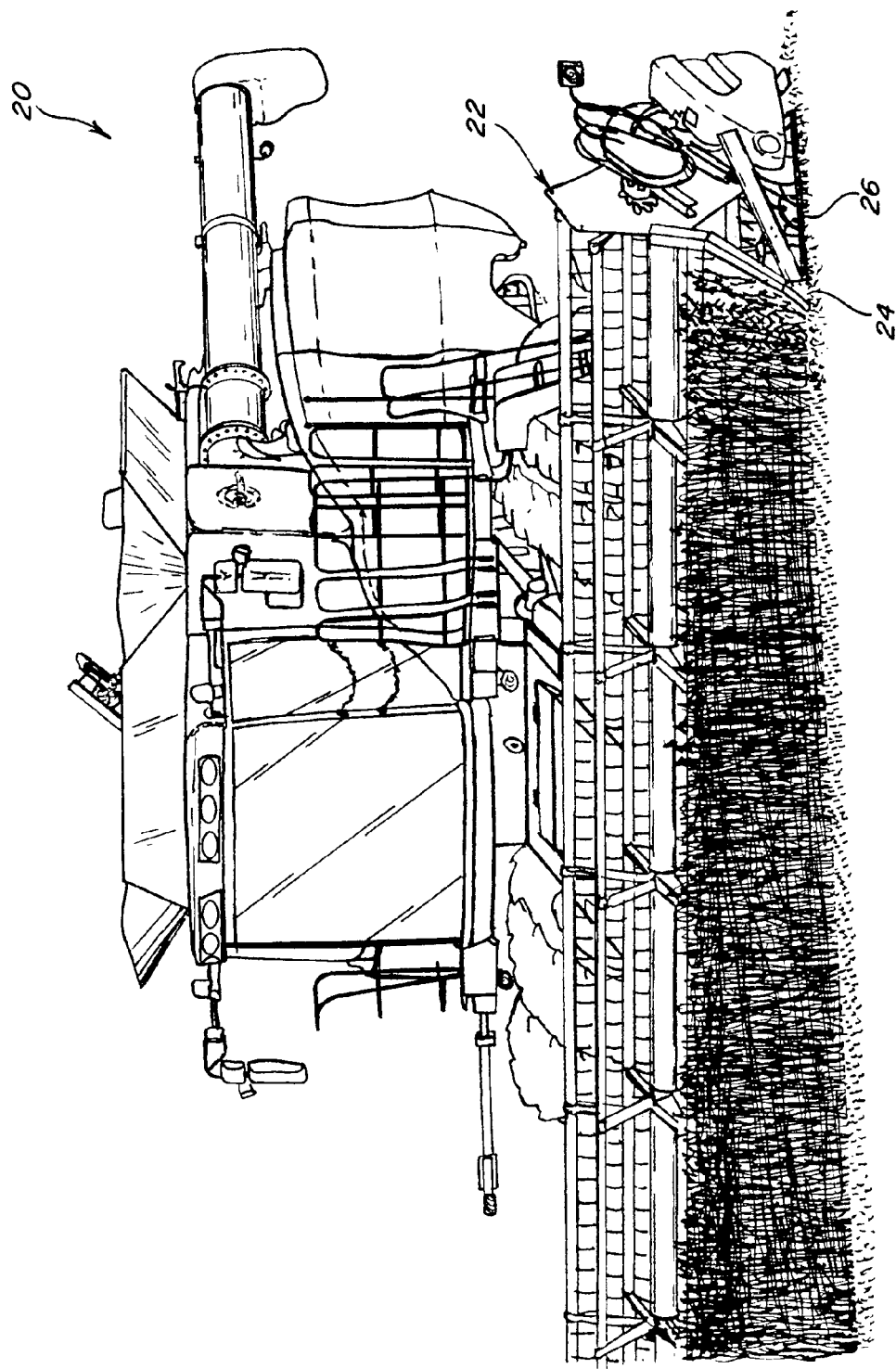
FIG. 1 is a perspective view of an agricultural combine, including a representative header with which support apparatus of the invention can be used for supporting a divider or dividers of the header.

Referring to FIG. 1, a self-propelled combine 20 is shown, including a header 22 with a divider 24 supported by support apparatus 26 constructed and operable according to the teachings of the present invention. Divider 24 is of a conventionally constructed type typically found on grain type headers such as header 20 illustrated, operable as combine 20 is propelled along a field, for movement between plants for dividing those to be cut and gathered by header 22 from those that are not to be cut. For this purpose, divider 24 has an overall wedge shape when viewed from the side, and is comprised of various fore and aft extending guards configured for lifting and guiding the plants to be cut to the plant cutting mechanism of the header. Divider 24 is disposed at the end of a cutting mechanism of header 22, which here is depicted as a sickle type cutter including an elongate end-to-end array of knife sections reciprocatingly movable in a side-to-side direction for severing crops from a field as combine 20 is moved forwardly thereover. Header 22 additionally includes a conveyor arrangement operable for gathering the cut crops, and conveying them to a center region of header 22, and into a feeder of combine 20, in the well-known manner. A substantially identical divider and support apparatus is located on the opposite end of header 22 and operable in the same manner.

Here, it should be understood that it is contemplated that the apparatus of the invention has utility for use for supporting dividers of a wide variety of configurations, for a wide variety of headers, including for other plant cutting machines, such as windrowers, and therefore is not to be limited in scope of applicability to the associated apparatus shown. Combine 20 is also of conventional construction and operation, for separating grain from the cut crops, collecting the grain, and discharging the material other than grain. For windrower applications, combine 20 would be replaced by a tractor.

Figure 2:
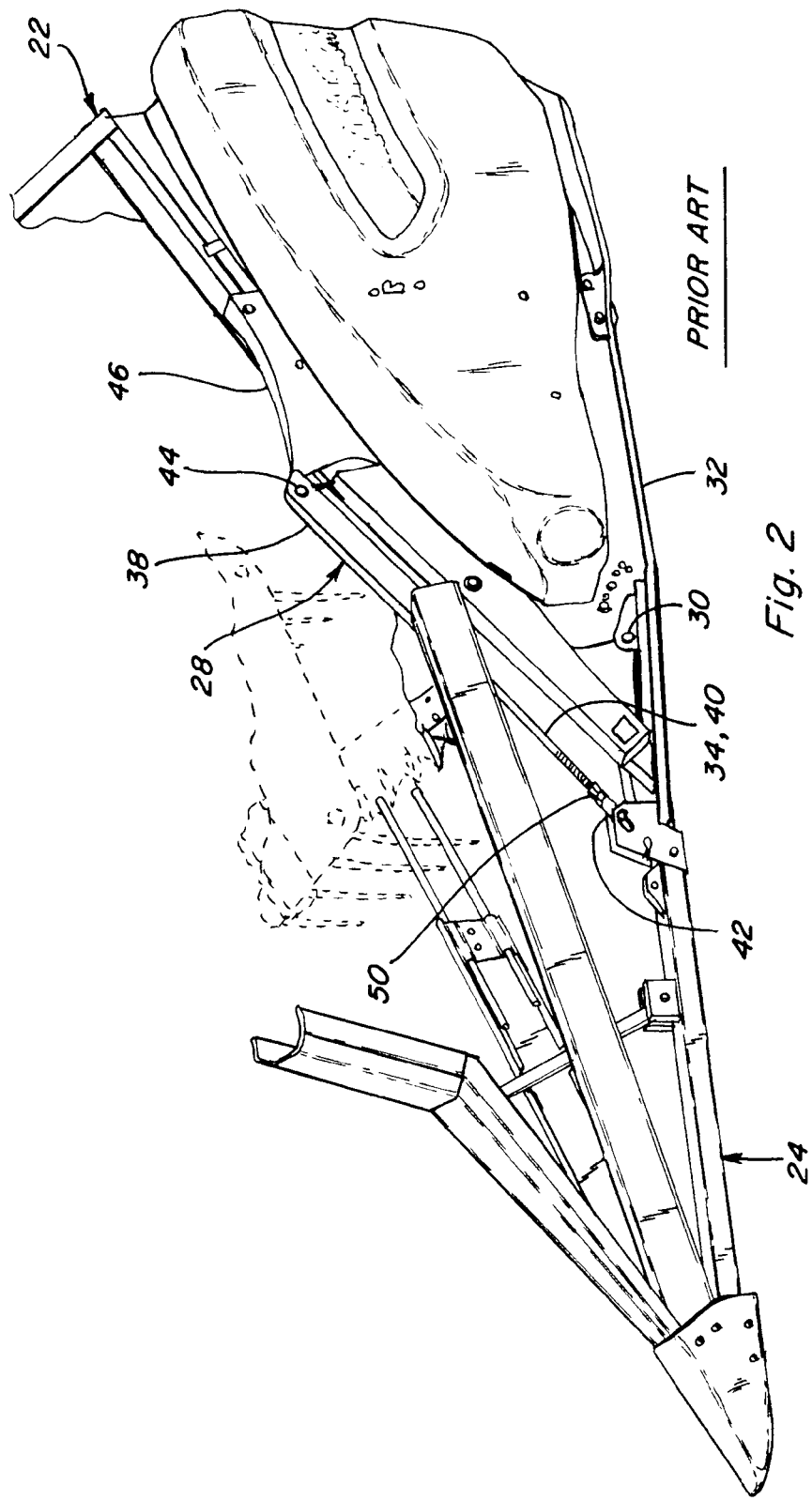
FIG. 2 is an enlarged fragmentary perspective view of the header of FIG. 1, showing representative prior art divider support apparatus.
Figure 3:
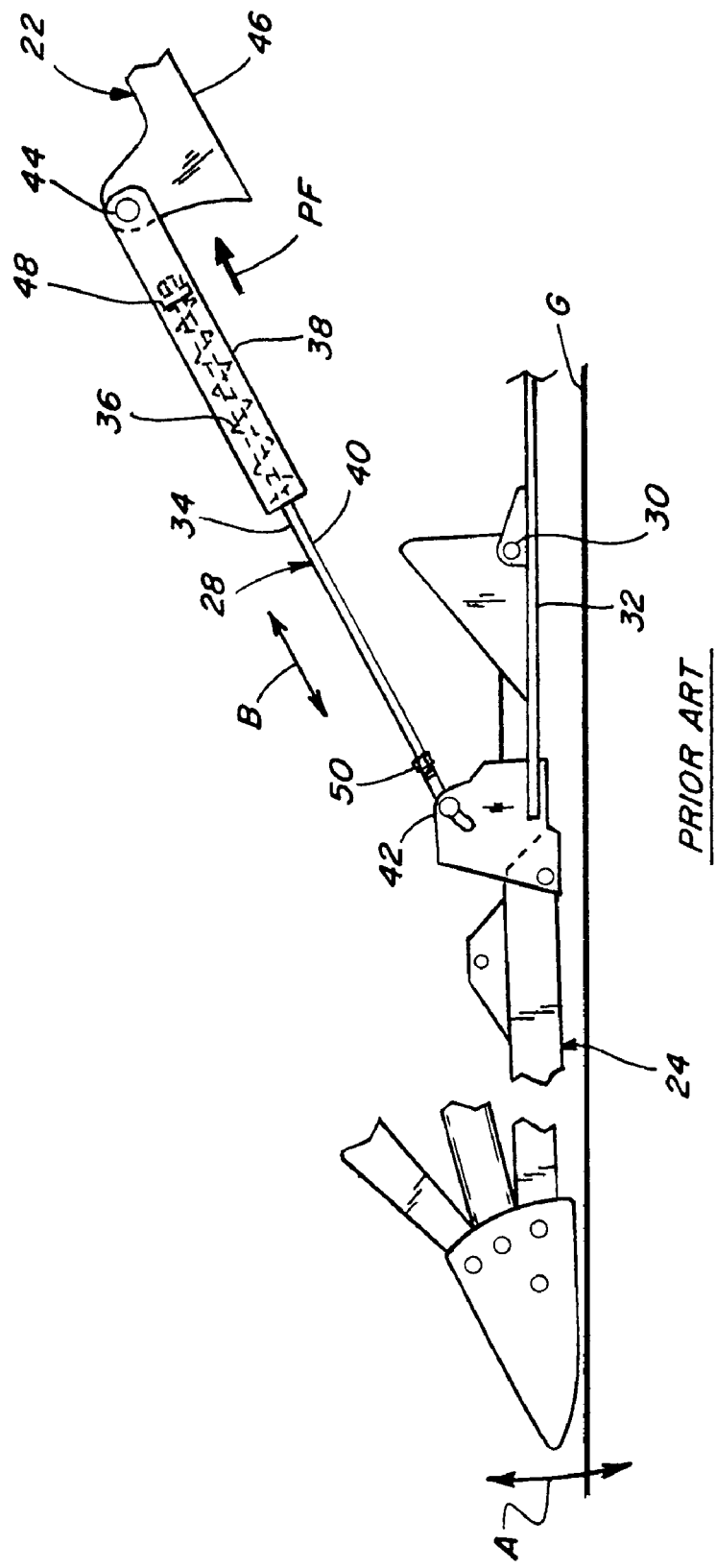
FIG. 3 is an enlarged fragmentary side view of the header and prior art divider support apparatus of FIG. 2.
Figure 4:
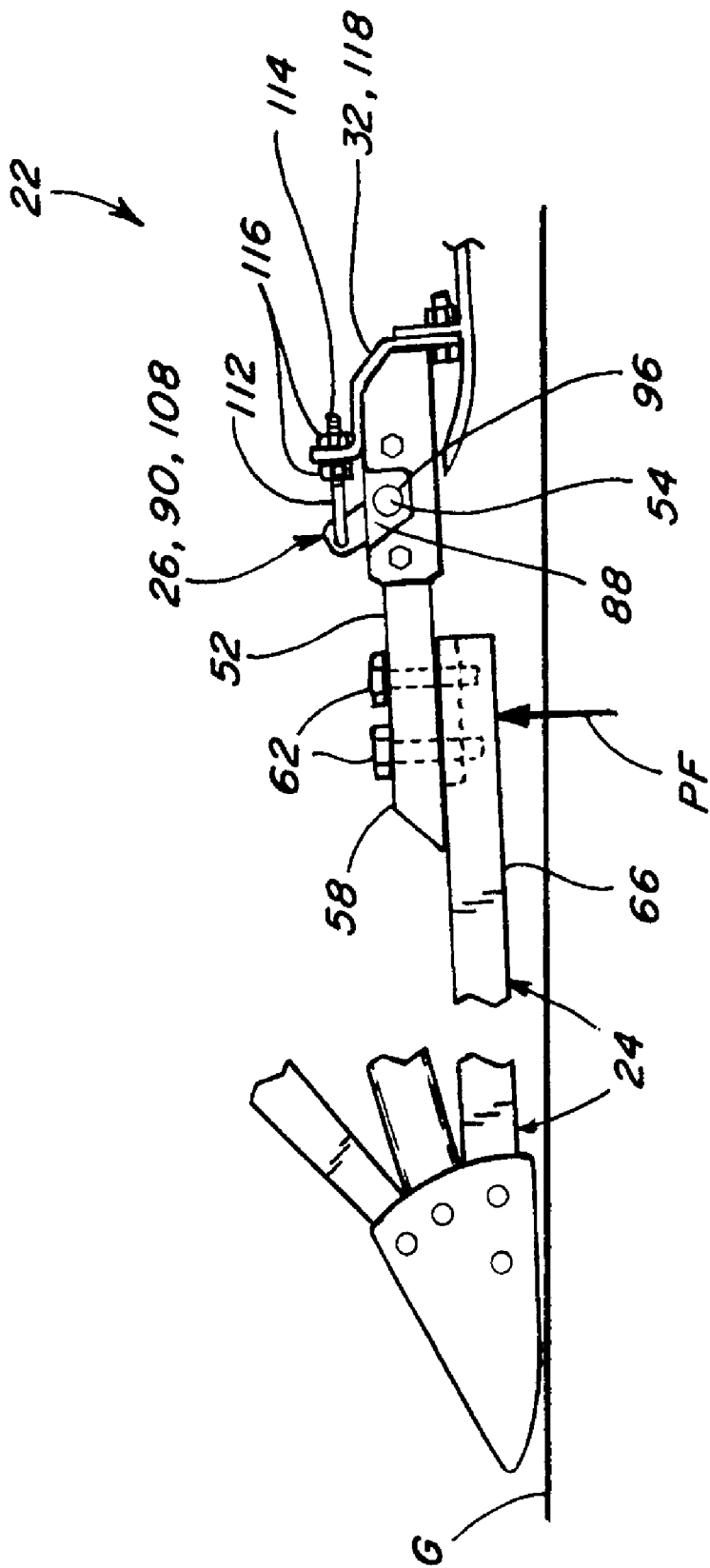
FIG. 4 is an enlarged fragmentary side view of the header, showing divider support apparatus of the present invention.
Figure 5:
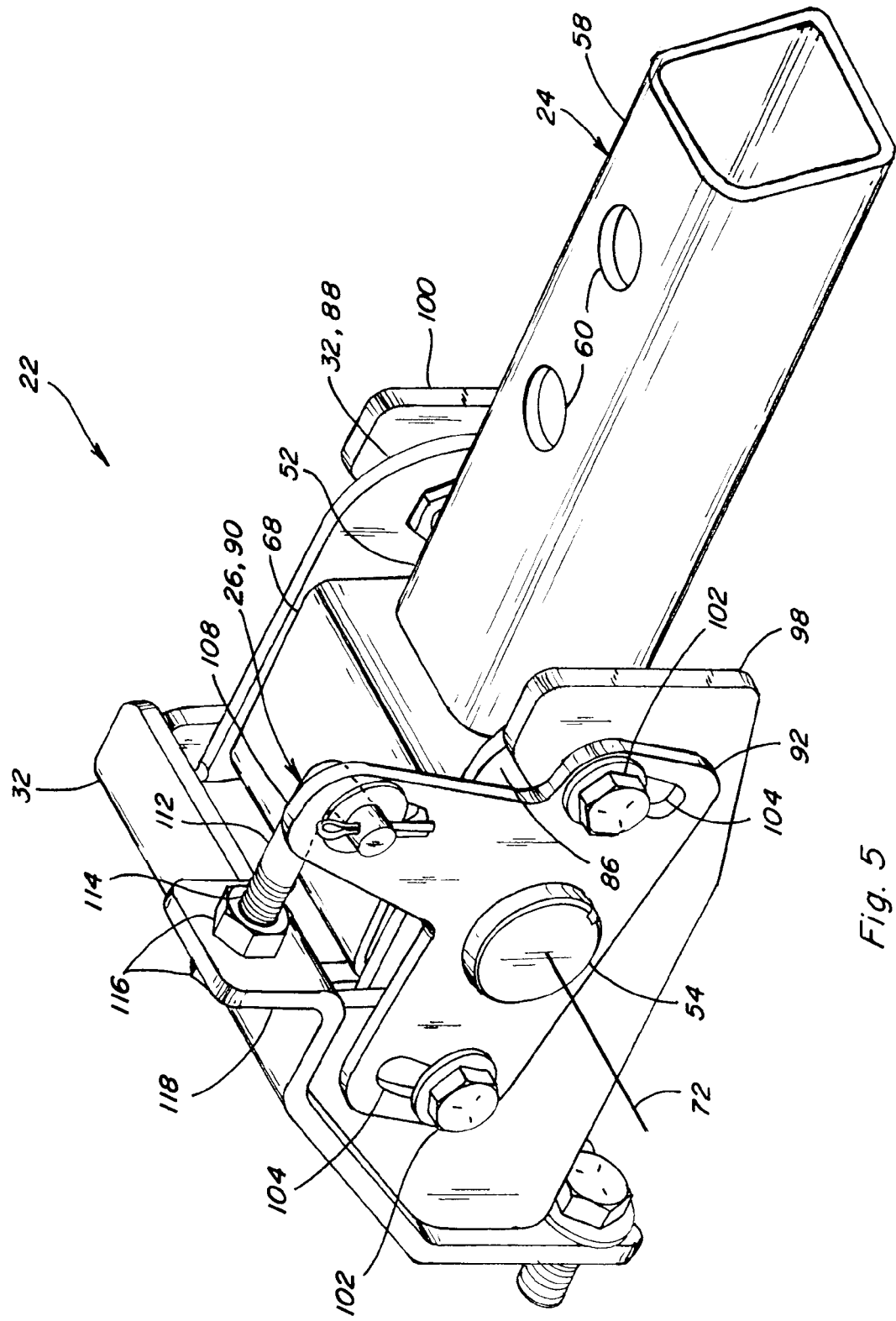
FIG. 5 is an enlarged fragmentary perspective view of the header and divider support apparatus of FIG. 4.
Figure 6:
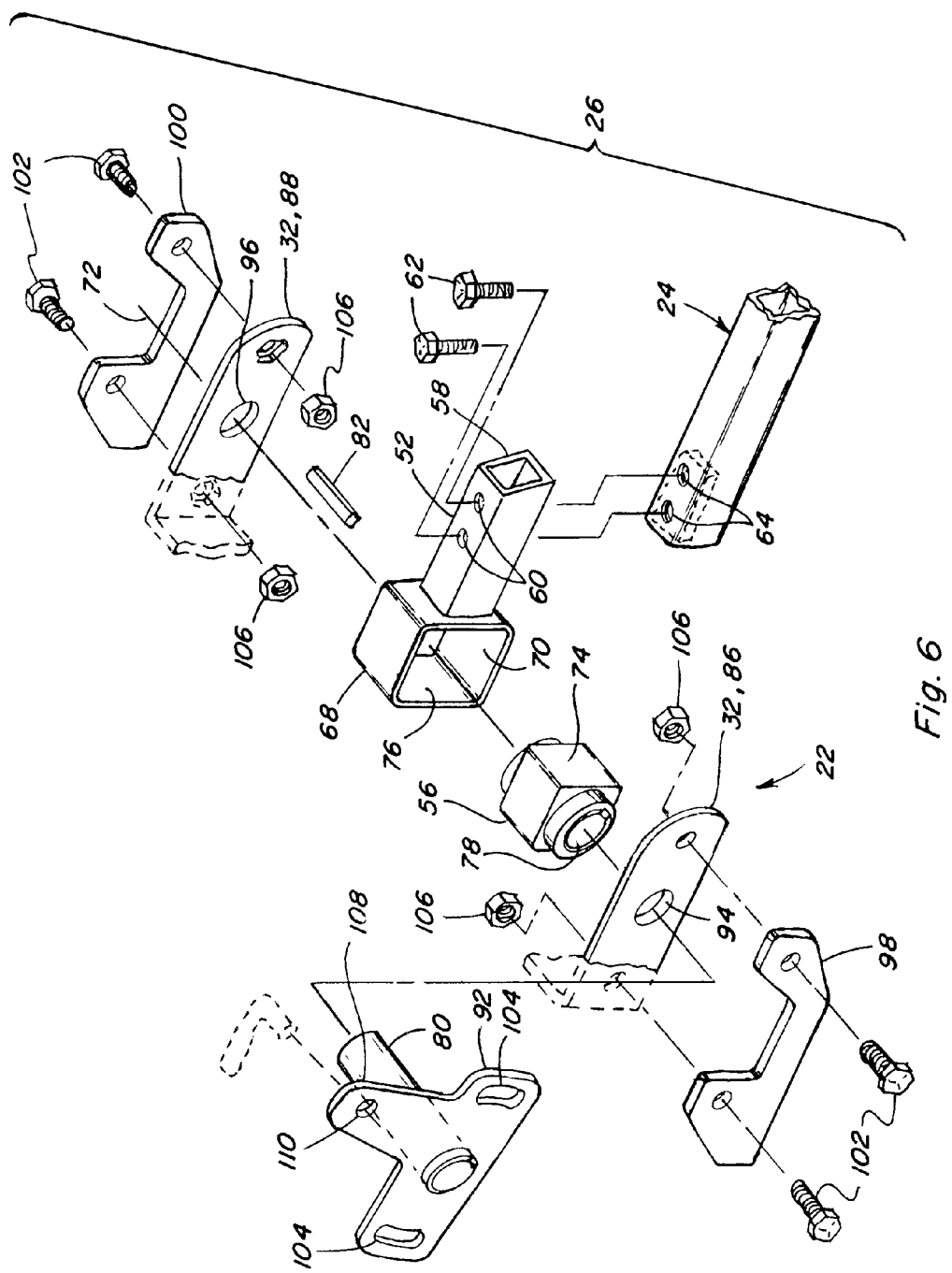
FIG. 6 is an exploded perspective view showing aspects of the support apparatus of FIGS. 4 and 5.

Referring also to FIGS. 2 and 3, before discussing support apparatus 26 of the invention, a prior art spring rod type support apparatus 28 will be discussed to illustrate shortcomings and disadvantages of that known mechanism. Prior art support apparatus 28 is of well known construction and includes a pivot joint 30 pivotally connecting divider 24 to a frame 32 of header 22 for upward and downward movement, as denoted by arrow A in FIG. 3, and a spring rod mechanism 34 for exerting a preload force PF against divider 24. Spring rod mechanism 34 connects to divider 24 forwardly of pivot joint 30 and includes a spring 36 carried in a housing 38, which in turn carries an upper end of a rod 40. A lower end of rod 40 is connected by a pivot connection 42 to divider 24, and an upper end of housing 38 is connected by a pivot connection 44 to an upper frame element 46 of frame 32. Spring rod mechanism 34 is adjustable for setting preload force PF, using a threaded adjusting nut mechanism 48 on an upper end of rod 40 which can be tightened to compress spring 36. A turnbuckle 50 on the lower end of rod 40 is adjustable for setting a position of divider 24 above a ground surface G. These settings can also be made to allow divider 24 to rest on ground surface G, if desired.

In operation, as header 22 moves along or just above ground surface G, for instance while harvesting legumes such as soybeans, when divider 24 contacts raised ground features, it will pivot upwardly about joint 30 and move rod 40 upwardly also, as denoted by upwardly directed arrow B. Because preload force PF is created by the compression of spring 36, it will act to urge rod 40 and thus divider 24 upwardly, to reduce the force required to raise divider 24 resulting from the ground contact, thus providing a well known "float" capability. This will also cushion downward movements of header 24 once the divider has passed over a raised ground feature or obstruction. However, a shortcoming that can be observed is that spring mechanism 28 is large and complex. Mechanism 28 also provides no significant means of damping abrupt or vibrational movements of divider 24. As another limitation, once divider 24 has lifted sufficiently to decompress spring 36 (which can occur rapidly if only a light preload force is utilized), there is no control or restraint on further upward movements until the divider reaches its physical end of upward travel, which can generate loud impact noises, bouncing movements, and is potentially damaging to the affected apparatus, e.g., when header 22 is transported over rough surfaces, both when raised on the combine and when being towed on a header cart, such as when traveling over rough fields, roads, and when exiting and entering fields. Still further, because spring 36 is compressed to create the preload force PF, force PF is highest when divider 24 is at its lowest position, and lowest or nonexistent when divider is at its highest position, which may be disadvantageous for some applications.

Referring also to FIGS. 4, 5, 6, 7 and 8, header 22 is shown incorporating support apparatus 26 for supporting divider 24 configured to overcome one or more of the shortcomings of prior art spring rod type mechanisms just discussed. More particularly, support apparatus 26 is configured to be operable for supporting a divider such as divider 24 shown, in a selectable free state position above (illustrated) or on ground surface G, while exerting an adjustable resilient preload force PF in a desired direction, e.g., upwardly thereagainst, to provide a desired float capability or feel. As a result, divider 24 will have less of a tendency to uncontrollably bounce when divider 24 strikes a raised ground feature or obstacle, and when header 22 is being transported in a raised position over the ground, e.g., traveling between fields, entering and leaving fields, and over rough road surfaces, such that noise and the possibility of resulting damage will be reduced. Support apparatus 26 is also relatively compact and simple in construction, compared to the prior known spring rod type devices.

Generally, the preload force PF will be the product of a torsional loading condition exerted between elements of support apparatus 26 by the weight of divider 24. The torsional loading condition is created by relative pivotal or rotational movement of a first element 52 of apparatus 26, and a second element 54, against a third element, which is a resilient biasing element or elements 56, disposed between first and second elements 52 and 54 and operable for resiliently deforming by the relative pivotal or rotational movements. Here, first element 52 is connected to and supports or carries divider 24, and second element 54 is connected to frame 32 of header 22, although it should be recognized that other configurations, such as a reversal of these connections, could be utilized. Essentially, this movement serves to elastically deform the one of more resilient biasing elements 56 between first and second elements 52 and 54, such that the biasing element or elements 56 store energy which is exerted as preload force PF in an opposite direction to that of the movements between elements 52 and 54. The stored energy and resultant preload force PF can be adjusted and set, so as to be less than the total amount of force required for pivoting divider 24 upwardly, and so as to be released with externally caused upward movements, such as when the divider is lifted by contact with raised ground contours, firmer soil, and the like, so as to reduce the amount of externally applied force required for the upward movements. The resilient composition of element 56 also allows it to damp vibrations and shocks.

First element 52 of apparatus 26 can be configured in any suitable manner for attaching in supportive or carrying relation to a divider, such as, but not limited to, divider 24 shown. Here element 52 includes a simple elongate arm portion 58 of rectangular tubular metal such as steel, attachable or fastenable to divider 24 in a suitable manner, for instance, but not limited to, using conventional threaded fasteners. To accomplish that, two vertical holes 60 are provided through arm portion 58, adapted for receiving mounting bolts 62 of sufficient length for passing through both holes 60, and threadedly engaging mating threaded holes 64 in a desired structural member of divider 24, such as a lower arm 66, bottom plate, or the like thereof. First element 52 additionally includes a rectangular tubular metal body portion 68 connected to, e.g., by welding, and extending transverse to arm portion 58. Body portion 68 extends about and defines a cavity 70. Second element 54 preferably comprises a shaft, and is constructed of a suitable metal material such as steel, and extends through cavity 70 centered about a pivotal axis 72, such that first element 52 extends about and contains second element 54.

Resilient biasing element 56 is constructed of a suitable material, such as, but not limited to, a resiliently elastic elastomeric material, such as a natural and/or synthetic rubber, and is disposed in cavity 70 between first element 54 and second element 56. Element 56 is configured to be biased in torsion for storing energy sufficient for generating a desired preload force level. To provide this capability, biasing element 56 is configured to have an outer surface 74 shaped to matingly engage an inner surface 76 of first element 52, and an inner surface 78 shaped to matingly engage an outer surface 80 of second element 54. To provide robustness, second element 54 preferably includes a cylindrical bushing of a suitable material, such as a metal, which is suitably connected to the resilient elastomeric material of element 54, such as by bonding, and which includes inner surface 78. In turn, inner surface 78 is fixedly connected to outer surface 80 of second element 54 in a suitable manner, such as with one or more keys 82 received in mating keyways 84 in surfaces 78 and 80.

Second element 54, biasing element 56, first element 52, and divider 24 attached thereto, are supported by and between spaced apart ribs 86 and 88 of frame 32. A preload adjusting mechanism 90 of apparatus 26, is provided to allow adjusting and fixing a pivotal position of second element 54 about pivotal axis 72 relative to ribs 86 and 88. Adjusting mechanism 90 includes an adjusting plate 92 fixedly mounted to one end of second element 54, for instance, by welding, for pivotal movement therewith about pivotal axis 72. Second element 54 is of sufficient length to extend through, and be supported for the pivotal movement within, holes 94 and 96 through ribs 86 and 88. Backing plates 98 and 100 are located beside and outwardly of ribs 86 and 88 to provide robustness, with adjusting plate 92 disposed outwardly of plate 98. Mounting bolts 102 pass through holes in plates 98 and 100, and ribs 86 and 88, and also arcuate holes 104 in adjusting plate 92, and threadedly engage nuts 106 disposed between ribs 86 and 88. Thus, it can be seen that tightening bolts 102 through arcuate holes 104 will fix or hold adjusting plate 92 to rib 86 at a selected pivotal position about axis 72, and thus hold second element 54 also.

Adjusting plate 92 additionally includes a radially outwardly extending torque arm 108 including a hole 110 therethrough. An adjusting link 112 has an end pivotally connected to torque arm 108 in a suitable manner, e.g., by a hook, pin or fastener which passes through hole 110. An opposite threaded end 114 of adjusting link 108 passes through a hole on a fixed structural element 118 of frame 32 and is securable thereto in a desired longitudinal position by nuts 116 disposed on both sides of element 118. Longitudinal movement of adjusting link 112 relative to element 118 of frame 32 is thus achievable by variously tightening and loosening of the nuts 116 to enable pivotally moving and adjusting torque arm 108, and thus adjusting link 112 and second element 54, about pivotal axis 72, and relative to first element 52, for torsionally loading resilient element 56 and creating a preload condition.

Figure 7:
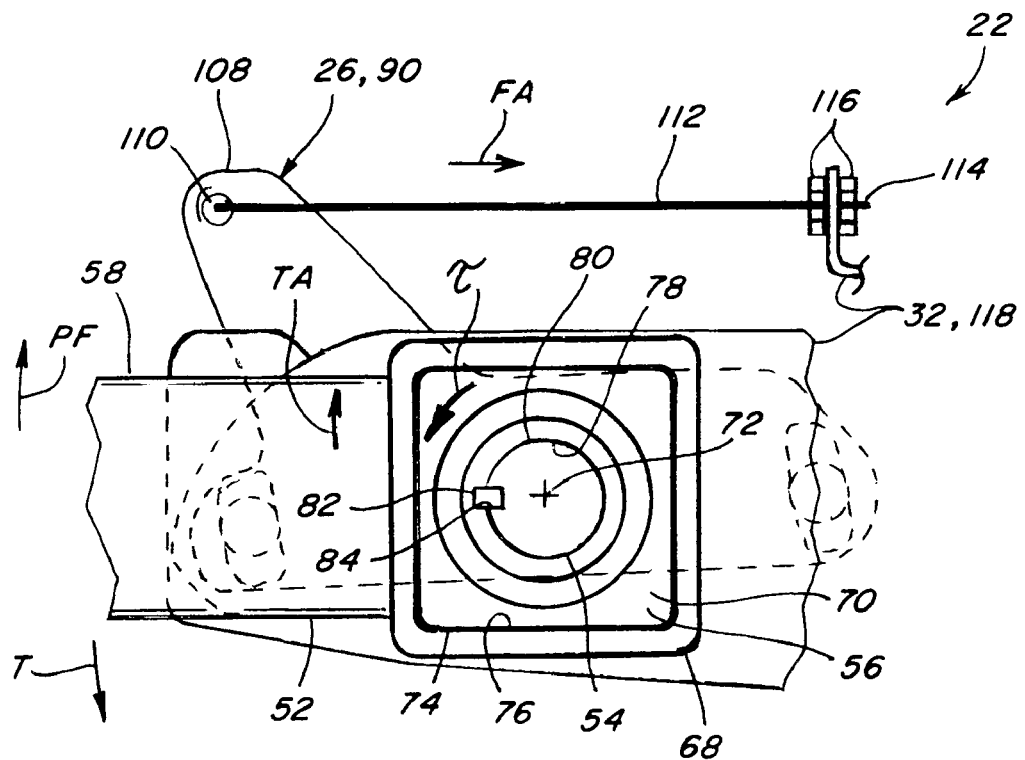
FIG. 7 is an enlarged fragmentary schematic side view of aspects of the header and support apparatus of the invention, illustrating a force loading condition thereon.
Figure 8:
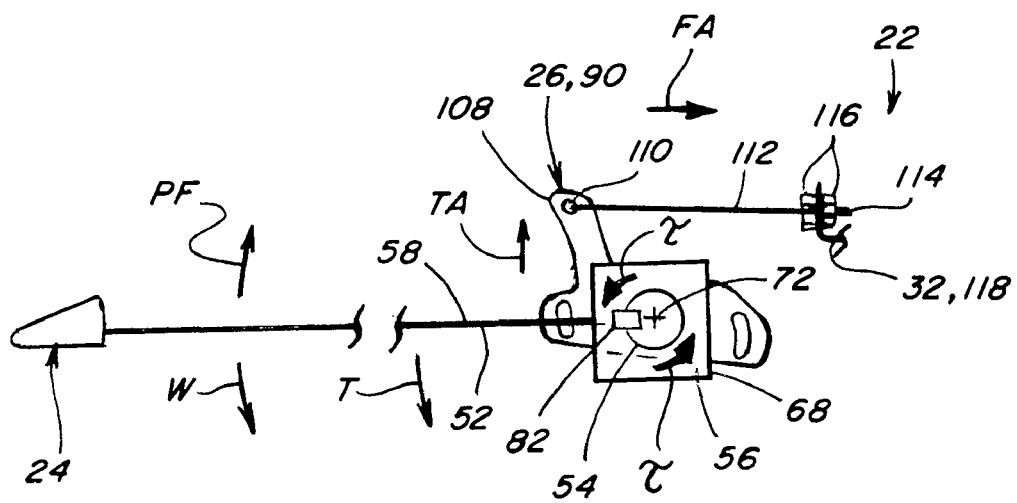
FIG. 8 is another simplified fragmentary schematic side view of aspects of the header and support apparatus of the invention, illustrating still more force loading thereon in a raised mode.

FIGS. 7 and 8 illustrate the adjusting capability of apparatus 26 for achieving a desired preload. Generally, when first element 52 is connected in supporting or carrying relation to a divider such as divider 24, the weight W of the divider will exert a torque, denoted by arrow T, against first element 52, and through resilient biasing element 56 and key or keys 82, to second element 54, in a counterclockwise direction about pivotal axis 72. Because one end of second element 54 is connected by torque arm 108 via adjusting plate 92, and thus to structural element 118 of frame 32, at least that end of second element 54 is not able to pivot or rotate in the counterclockwise direction. As a result, torque τ will create a torsional loading condition 2 on that assembly, particularly on biasing element 56 and second element 54. Increasing weight W, and/or applying a force for pivoting first element 52 downwardly (counterclockwise) relative to biasing element 56 and second element 54 will increase torque T and thus the amount or level of torsional loading condition τ. Conversely, reducing weight W and/or applying a force for pivoting element 52 clockwise relative to second element 54 will decrease torque T and thus the level of torsional loading condition τ.

Resilient biasing element 56 is designed to have sufficient elasticity or resiliency properties such that anticipated loads exerted against it, e.g., torque T, will be sufficient to elastically deform it to a known limited extent, such that first element 52 and divider 24 carried thereby will be capable of pivoting or rotating counterclockwise about axis 72 relative to second element 54, by a limited amount. As this occurs, biasing element 56 will store energy, so as to exert an upwardly (clockwise) directed preload force, denoted by arrow PF against first element 52, and thus, divider 24. This preload force PF is advantageous, as it will urge first element 52 and divider 24 to pivot in the clockwise direction, to thereby reduce the amount of force at least initially required to pivot divider 24 in that direction and thus raise or lift it.

Additionally, by tightening or loosening fasteners 116, an adjusting force, denoted by arrow FA, can be exerted against adjusting link 112 in varying amounts, to draw or pull torque arm 108 toward structural element 118. Force FA will apply a second torque TA against second element 54, but in a direction opposite the direction of torque T. This will act to increase the magnitude of torsional loading condition τ and consequently the preload force PF resulting from the stored energy in biasing element 56. In this manner, it can be seen that preload force PF can be desirably increased or decreased by an amount corresponding to the applied adjusting force FA.

When a desired preload force PF, and position of divider 24, has been achieved, bolts 102 through adjusting plate 92 can be tightened to fix plate 92 and second element 54 to rib 86 at the selected position, to set the preload force PF at the selected value.

As an additional feature, because only one end of second element 54 is fixed to frame 32, torsional loading condition τ will act to urge element 54 to twist, and it can be configured, e.g., have selected torsional elasticity, so as to resiliently yield to torsional conditions that exceed the elasticity of resilient biasing element 56 to a desired extent. Thus, second element 54 and biasing element 56 can be selected such that torsional loading conditions τ greater than a certain level can effect resilient deformation of element 56 to a larger extent, and element 54 to a lesser extent, to avoid damage to biasing element 56 when near its elastic limit.

To illustrate the capabilities of the invention, in FIG. 7, arm portion of element 52 is illustrated being generally horizontal, representing a generally horizontal divider position. If this element is supported in this position by application of a desired adjusting force FA and adjusting plate 92 is fixed to rib 86, the resulting torsion load condition τ and preload force PF will be set.

Referring to FIG. 8, subsequently, if the divider 24 is pivoted upwardly, such as would be caused by contact with a raised ground feature, obstacle, or the like, first element 52 is pivoted upwardly (clockwise) about second element 54 from the position of FIG. 7, the preload force PF will be exerted to reduce the externally applied force or effort required to at least initially raise divider 24. Conversely, if divider 24 encounters a depression, soft grounder surface, or the like, so as to pivot down (counterclockwise), the amount of torsional loading and thus the preload force PF will be increased. As a result, subsequent upward pivoting of divider 24 will be assisted by force PF, which will gradually reduce with the release of the stored energy, such that divider 24 can more smoothly pass over changing ground characteristics, and impact forces, drag, and the like, will be reduced, with correspondingly less vibration transfer to the operator cab and the like. And, because biasing element 56 is preferably selected to be of an elastomeric material, the stored energy will exert preload force PF in a predictable damped or controlled manner as divider 24 is raised. Still further, all elements of apparatus 26 remain connected together through the range of travel of divider 24, such that there will be no instance when divider 24 will be allowed to bounce freely, thus eliminating problems such as possible damage and vibrational noises that can occur with the prior art support apparatus during travel.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. Support apparatus for a divider of a header for an agricultural plant cutting machine, comprising:
an adjustable torsional preload mechanism configured for connecting a divider to a frame of the header for upward pivotal movement relative to the frame about a pivotal axis, the mechanism including a first element configured for carrying the divider, and a second element configured for connection to the frame, at least one resilient biasing element disposed between the first element and the second element, wherein the second element and the biasing element share a common axis, and the common axis is substantially centered about the pivotal axis, further wherein the second element and the biasing element are substantially horizontally aligned with the first element, the first element being configured for creating a torsional loading condition on the second element and the biasing element operable for resiliently biasing the biasing element so as to exert a preload force in opposition to the torsional loading condition, and a preload adjusting mechanism in connection with at least one of the first element and the second element and operable for selectably increasing or decreasing the biasing of the at least one resilient biasing element in a manner for adjusting the preload force.

2. Support apparatus of claim 1, wherein the first element comprises an inner surface bounding an interior cavity containing the second element, the second element comprises a shaft, and wherein the at least one resilient biasing element comprises at least one elastomeric element disposed in the interior cavity and bearing against the inner surface for exerting the preload force against the first element, and wherein the at least one elastomeric element is configured and disposed for damping vibrations emanating from reciprocating movements of the divider supported by the support apparatus and limiting transmission of the vibrations to the frame.

3. Support apparatus of claim 2, wherein the at least one elastomeric element is bonded to at least one sleeve mounted about the shaft for rotation therewith about the pivotal axis.

4. Support apparatus of claim 3, wherein the sleeve is mounted to the shaft by at least one key.

5. Support apparatus of claim 1, wherein the preload adjusting mechanism is connected between the frame and the second element so as to be movable relative to the frame for selectably adjusting the preload force, and wherein the adjusting mechanism is fixable to the frame for setting the selected preload force.

6. Support apparatus of claim 5, wherein the preload adjusting mechanism comprises a torque arm connected to the first element or the second element and movable through a range of positions for adjusting the preload force.

7. Support apparatus of claim 6, further comprising a threaded assembly connected between the torque arm and the frame and threadedly engageable for selecting the preload force, and wherein the element to which the torque arm is connected is fixable to the frame for setting the selected preload force.

8. Apparatus for applying a preload force against a divider of a header for an agricultural plant cutting machine, comprising:
an assembly including a first element configured for supporting a divider, a second element configured for attachment to a frame of the header, one of the first and the second elements being disposed about the other of the first and the second elements, and at least one resilient biasing element disposed between the elements and configured for allowing relative pivotal movement thereof, wherein the second element and the biasing element share a common axis, and the common axis is substantially centered about the pivotal axis, further wherein the second element and the biasing element are substantially horizontally aligned with the first element, the biasing element being adjustably biasable by a torsional condition created between the first element and the second element, so as to apply a preload force against the first element in a direction for biasing the support arm in a selected upward or downward direction; and
a preload adjusting mechanism in connection with at least one of the first element and the second element and operable for selectably biasing the at least one resilient biasing element in a manner for adjusting the preload force.

9. Apparatus of claim 8, wherein the second element comprises a shaft and the first element comprises an inner surface bounding an interior cavity containing the shaft, and wherein the at least one resilient biasing element comprises at least one elastomeric element disposed in the interior cavity and bearing against the inner surface and the shaft for exerting the preload force against the first element.

10. Apparatus of claim 9, wherein the at least one elastomeric element is bonded to at least one sleeve mounted about the shaft for rotation therewith about the pivotal axis.

11. Apparatus of claim 10, wherein the sleeve is mounted to the shaft by at least one key.

12. Apparatus of claim 8, wherein the preload adjusting mechanism is configured to be connectable between the frame and the second element so as to be movable relative to the frame for selecting the preload force, and wherein the adjusting mechanism is fixable to the frame for setting the selected preload force.

13. Apparatus of claim 8, wherein the preload adjusting mechanism comprises a torque arm connected to the second element and movable for pivoting the second element about the pivotal axis relative to the first element, through a range of positions for selecting the preload force.

14. Apparatus of claim 13, further comprising a threaded assembly connectable between the torque arm and the frame so as to be threadedly operable for selecting the preload force, and wherein the second element is configured to be fixable to the frame for setting the selected preload force.

15. Support apparatus for a divider of a header for an agricultural plant cutting machine, comprising:
a support arm configured for supporting a divider; and
an adjustable preload mechanism configured for connecting the support arm to a header frame for upward and downward pivotal movement relative to the frame about a pivotal axis, the mechanism including a shaft configured for fixed connection to the frame, a structural element disposed about the shaft and connected to the support arm, a resilient biasing element mounted on the shaft and cooperatively engaged with the structural element and biasable by a torsional loading condition between the structural element and the shaft for applying a preload force therebetween, wherein the structural element and the biasing element share a common axis, and the common axis is substantially centered about the pivotal axis, further wherein the structural element and the biasing element are substantially horizontally aligned with the support arm, and a preload adjusting mechanism in connection with at least one of the shaft and the structural element and operable for selectably adjusting the biasing of the resilient biasing element against the structural element for urging the support arm upwardly about the pivotal axis.

16. Support apparatus of claim 15, wherein the preload adjusting mechanism comprises a torque arm connected to the shaft and movable for pivoting the shaft about the pivotal axis relative to the structural element, through a range of positions for selectably adjusting the preload force.

17. Support apparatus of claim 16, further comprising a threaded assembly connectable between the torque arm and the frame so as to be threadedly operable for selectably adjusting the preload force.

18. Support apparatus of claim 15, wherein the biasing element comprises a resilient elastomeric material, and is configured and disposed for damping vibrations emanating from movements of the divider, and limiting transmission of the vibrations to the frame.

* * * * *